US012509896B2

(12) United States Patent
Spicer et al.

(10) Patent No.: US 12,509,896 B2
(45) Date of Patent: Dec. 30, 2025

(54) SPA HAVING DRAIN SYSTEM FOR IMPROVED WATER CIRCULATION

(71) Applicant: Strong Industries, Inc., Northumberland, PA (US)

(72) Inventors: Wade Spicer, Northumberland, PA (US); Charles Woods, West Manchester, OH (US)

(73) Assignee: STRONG INDUSTRIES, INC., Northumberland, PA (US)

( * ) Notice: Subject to any disclaimer, the term of this patent is extended or adjusted under 35 U.S.C. 154(b) by 147 days.

(21) Appl. No.: 18/507,209

(22) Filed: Nov. 13, 2023

(65) Prior Publication Data

US 2024/0159069 A1 May 16, 2024

Related U.S. Application Data

(60) Provisional application No. 63/425,020, filed on Nov. 14, 2022.

(51) Int. Cl.

| | |
|---|---|
| ***E04H 4/00*** | (2006.01) |
| ***A61H 3/00*** | (2006.01) |
| ***A61H 33/00*** | (2006.01) |
| ***E04H 4/12*** | (2006.01) |

(52) U.S. Cl.

CPC ....... *E04H 4/0037* (2013.01); *A61H 33/6073* (2013.01); *E04H 4/1236* (2013.01); *A61H 33/6089* (2013.01)

(58) Field of Classification Search

CPC ... E04H 4/0037; E04H 4/1236; E04H 4/0031; E04H 2004/6068; E04H 4/12; E04H 4/1645; A61H 33/6073; A61H 33/6068; A61H 33/6089

USPC .................................... 4/507, 496, 506, 513

See application file for complete search history.

(56) References Cited

U.S. PATENT DOCUMENTS

| | | | | | |
|---|---|---|---|---|---|
| 5,459,887 | A * | 10/1995 | Roman | A61H 33/6073 4/574.1 |
| 5,987,663 | A * | 11/1999 | Ludlow | A61H 33/6063 4/541.1 |
| 7,908,684 | B2 * | 3/2011 | Ludlow | A61H 33/02 4/584 |
| 2008/0134425 | A1 * | 6/2008 | Tatum | A61H 33/027 4/492 |

* cited by examiner

*Primary Examiner* — David J Walczak

(74) *Attorney, Agent, or Firm* — Grogan, Tuccillo & Vanderleeden, LLP

(57) ABSTRACT

A spa includes a shell having at least one cavity, the spa shell being configured to hold a volume of water, at seat insert having a plurality of hydrotherapy jets, the seat insert being received in the at least one cavity and defining a space between the seat insert and the shell, and a drain associated with the at least one cavity for removing water from the space between the seat insert and the shell.

20 Claims, 8 Drawing Sheets

SPA HAVING DRAIN SYSTEM FOR IMPROVED WATER CIRCULATION

CROSS-REFERENCE TO RELATED APPLICATIONS

This application claims the benefit of U.S. Provisional Application Ser. No. 63/425,020, filed on Nov. 14, 2022, which is hereby incorporated by reference herein in its entirety.

FIELD OF THE INVENTION

The present invention relates generally to spas and hot tubs and, more particularly, to a drain system for a spa that facilitates water circulation and inhibits algae growth.

BACKGROUND OF THE INVENTION

Spas, also commonly known as hot tubs, are popular fixtures that are used in many homes. They generally include a deep, vacuum formed tub having a smooth acrylic liner or shell that is filled with heated water and which is used for soaking and relaxation. Spas typically include water jets for massage purposes.

Typically, the acrylic liner is formed into shapes that provide a variety of seating arrangements within the tub. The spa includes a hydrotherapy system that includes a plurality of hydrotherapy jet assemblies situated within the acrylic liner at the seating positions for passing water into the tub for hydrotherapy purposes, a suction fitting typically located on a vertical surface of the tub foot well providing a means of egress for the water within the tub, associated plumbing located behind the shell, and a water pump to circulate water out of the tub through the suction fitting, through the plumbing, and back through the jet assemblies under pressure into the tub. As the water passes through the plumbing, it is treated (sanitized, heated and/or cooled). As the water is sent to the jets, it is forced through venturi where air from an air source is entrained within the water such that when the water is ejected by the jet, it is aerated. A cabinet surrounds the tub and encloses the hydrotherapy workings of the spa, as is known in the art.

As is known in the art, each seat or seating position is usually equipped with hydrotherapy jets that allow the pressurized flow of water to be directed at various parts of a user's body as it enters the tub. The water flow may be aerated for additional effect, as indicated above, and some or all of the jets may also automatically move or rotate, causing the changing pressure of the water on the body to provide a massage like effect.

Some spas, rather than having the seating arrangements and hydrotherapy jets formed into the spa shell, itself, feature modular hydrotherapy systems. These systems employ seat inserts or pods having an array of hydrotherapy jets that are removably received in recesses or depressions in the spa shell (e.g., via removable fasteners, sliding engagement, snap-fit engagement, or other reversibly removable means). In such systems, the acrylic shell is constructed with depressions or hollows in the shell wall. Each of the hollows is fitted with a seat insert or pod on which jets or nozzles are mounted for injecting water and/or air into the interior of the spa shell. Each jet or nozzle may be connected to an air or water manifold of the seat insert, and the manifolds are configured for fluid connection with primary water and air supply lines. Such jet pack modules therefore only require a single water supply connection and/or a single air supply connection for each seating position (i.e., a single connection between the primary water supply and the water manifold of the jet pack provides water to all of the jets on the jet pack module; similarly, a single connection between the primary air supply and the air manifold of the jet pack provides air to all of the jets on the jet pack module). Such a system also ensures that any leaks from the jets are contained within the interior volume of the spa shell, not behind the shell. This construction also allows the spa to be upgraded or repaired with new jets by an easy replacement of the jet pack module with a new one having the same or different jets. Examples of such system are disclosed in, for example, U.S. Patent Application Publication No. 2021/0190239 and U.S. Pat. No. 9,597,258, which are hereby incorporated by reference herein in their entireties.

The use of removable seats inserts or pods, however, can create stagnant water zones behind the seat inserts (i.e., intermediate the rear of the seat inserts and the spa shell). As water does not circulate sufficiently in this space, algae, biofilm and bacteria growth within this space can be problematic.

In view of the above, there is a need for a spa that improves water circulation in the space behind the seating inserts, in order to inhibit algae, biofilm and bacteria growth.

SUMMARY OF THE INVENTION

It is an object of the present invention to provide a spa.

It is another object of the present invention to provide a spa having a drain system that facilitates water circulation.

It is another object of the present invention to provide a spa having a drain system that facilitates water circulation in the space between seat inserts and the spa shell to inhibit algae growth, biofilm and bacteria growth within such space.

These and other objects are achieved by the present invention.

According to an embodiment of the present invention, a spa includes a shell having at least one cavity, the spa shell being configured to hold a volume of water, at seat insert having a plurality of hydrotherapy jets, the seat insert being received in the at least one cavity and defining a space between the seat insert and the shell, and a drain associated with the at least one cavity for removing water from the space between the seat insert and the shell.

According to another embodiment of the invention, a method for hydrotherapy is provided. The method includes the steps of providing a spa having a shell having a recess, and a seat insert arranged within the recess, circulating water into the spa via at least one hydrotherapy jet on the seat insert, and circulating water between behind the seat insert within the recess by drawing water out of the shell through a suction fitting located within the recess.

According to yet another embodiment of the invention, spa is provided. The spa includes a shell having a plurality of recesses formed therein, a plurality of seat inserts corresponding to the plurality of recesses, the plurality of seat inserts being removably connected to the shell such that each recess and an associated seat insert defines a space therebetween, each seat insert including a plurality of hydrotherapy jets for directing pressurized water into the spa, and a suction fitting associated with each recess for effecting a flow of water through the space and out of the shell through the suction fitting.

BRIEF DESCRIPTION OF THE DRAWINGS

The present invention will be better understood from reading the following description of non-limiting embodiments, with reference to the attached drawings, wherein below.

DETAILED DESCRIPTION OF THE PREFERRED EMBODIMENT

Figure 1:
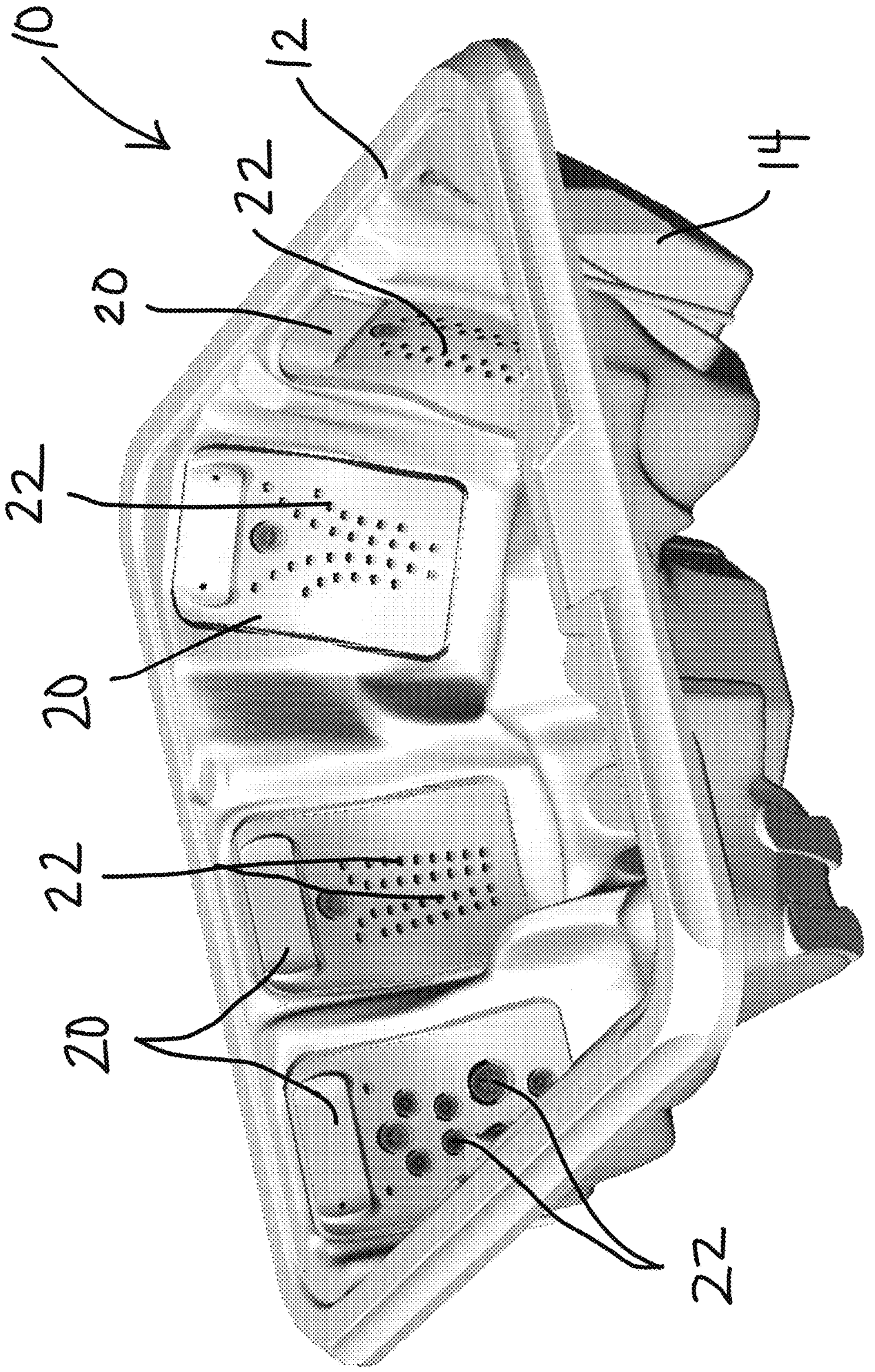
FIG. 1 is a perspective view of a portion of a spa having a plurality of seat inserts.

Referring to FIGS. 1-7, a spa 10, also referred to as a hot tub, according to an embodiment of the present invention is shown. The spa 10 is illustrated with the typical housing or cabinet thereof removed, for ease of illustration and understanding. The spa 10 includes a shell 12, formed from acrylic or other suitable material known in the art, having a plurality of depressions (also referred to herein as cavities 14 or recesses 14) formed therein. As best shown in FIGS. 3-7, for example, the depressions 14 may each include at least a back wall 16 that extends generally vertically, and a bottom wall or floor 18 that extends generally horizontally.

Figure 2:
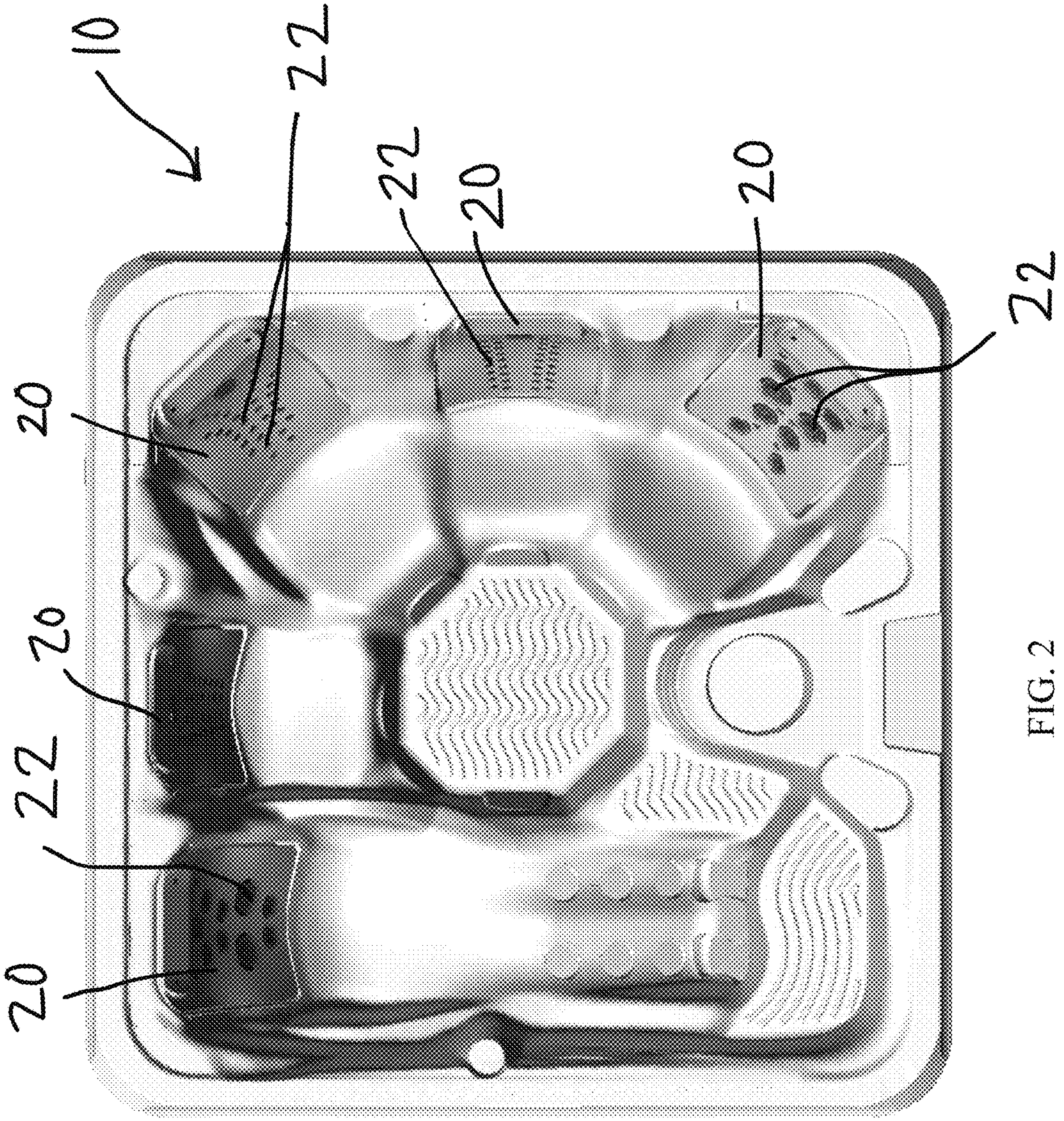
FIG. 2 is a top plan view of the portion of the spa of FIG. 1.

With specific reference to FIGS. 1 and 2, the spa 10 includes a plurality of seat inserts or pods 20 that are sized and shaped to generally correspond to the size and shape of the depressions 14 in the shell 12. As disclosed in, for example, U.S. Pat. No. 9,597,258, the seat inserts 20 are generally hollow and include an array of hydrotherapy jets 22 arranged on a front face thereof. The seat inserts 20 are each configured for fluid connection to an air and/or water supply through a conduit that extends through the shell 12 in the area of the depressions 14. As is known in the art, the seat inserts 20 are thus supplied with air and water through one (or at most two) fluid conduits (not shown). The water received by the seat inserts 20 is output by the hydrotherapy jets 22 on the front face of the seat inserts 20. This is in contrast to conventional systems where each hydrotherapy jet has a dedicated air/water supply line extending through the spa shell.

In an embodiment, the seat inserts or pods 20 may be removably connected to the shell 12 such as, for example, by removable fasteners, or by a sliding connection, snap-fit connection, or the like. The removable connection allows the pods 20 to be swapped in and out, as desired, without destroying or damaging the shell 12. In other embodiments, the pods 20 may be permanently connected to the spa shell 12 and or plumbing.

Figure 3:
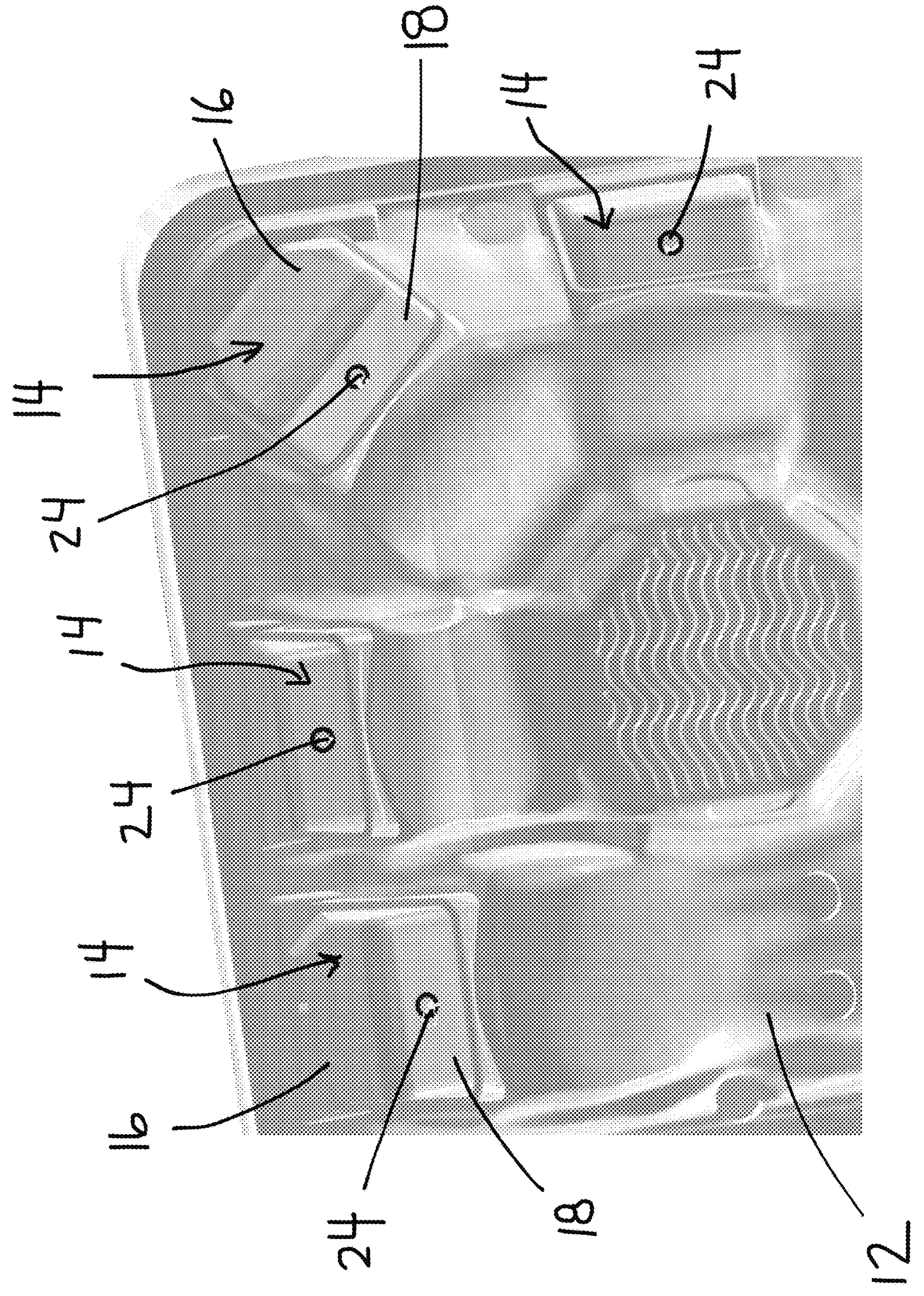
FIG. 3 is an enlarged, perspective view of a portion of a spa having seat inserts removed, illustrating locations of drain ports.
Figure 4:
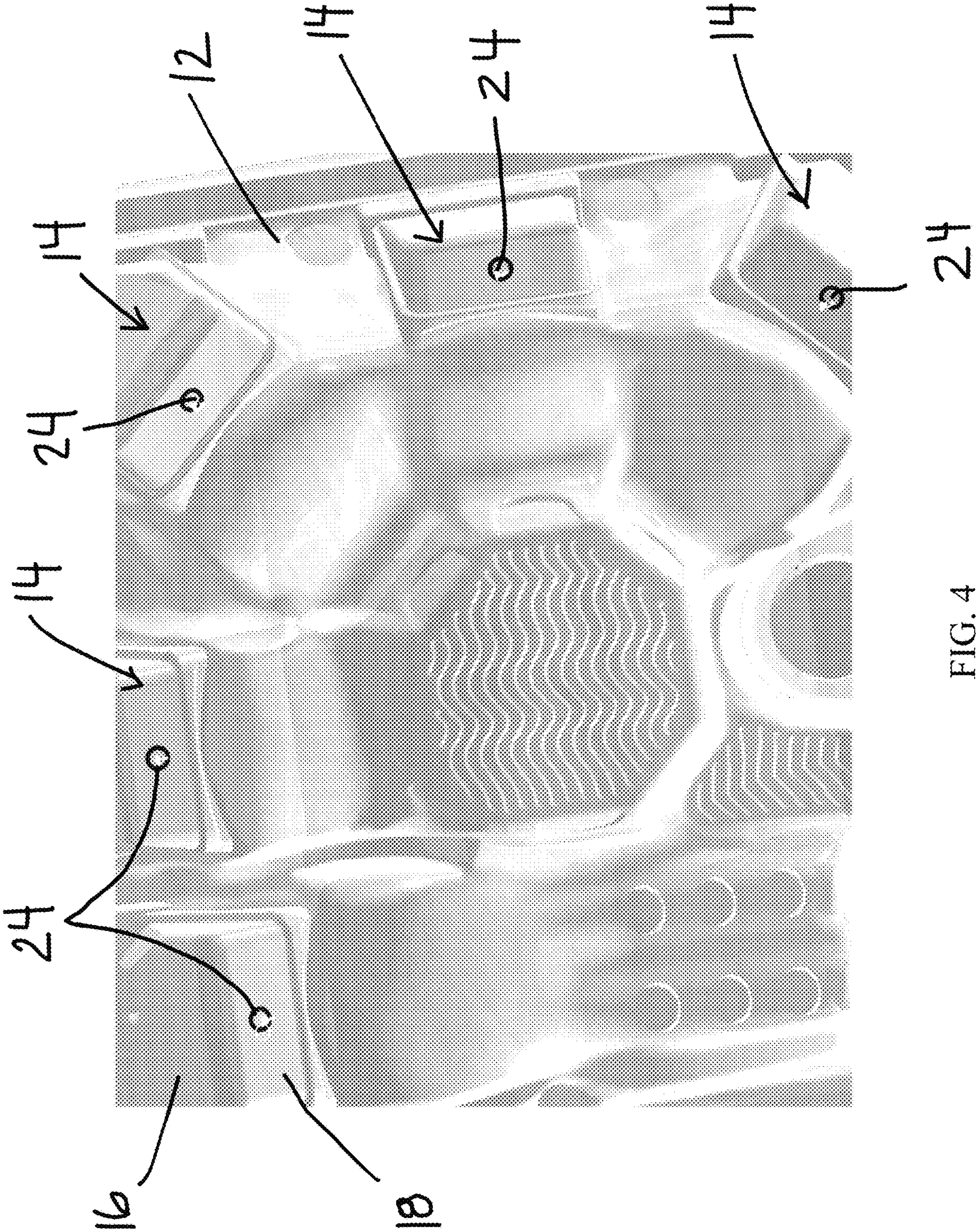
FIG. 4 is another enlarged, perspective view of a portion of a spa, showing the location of drain ports.
Figure 5:
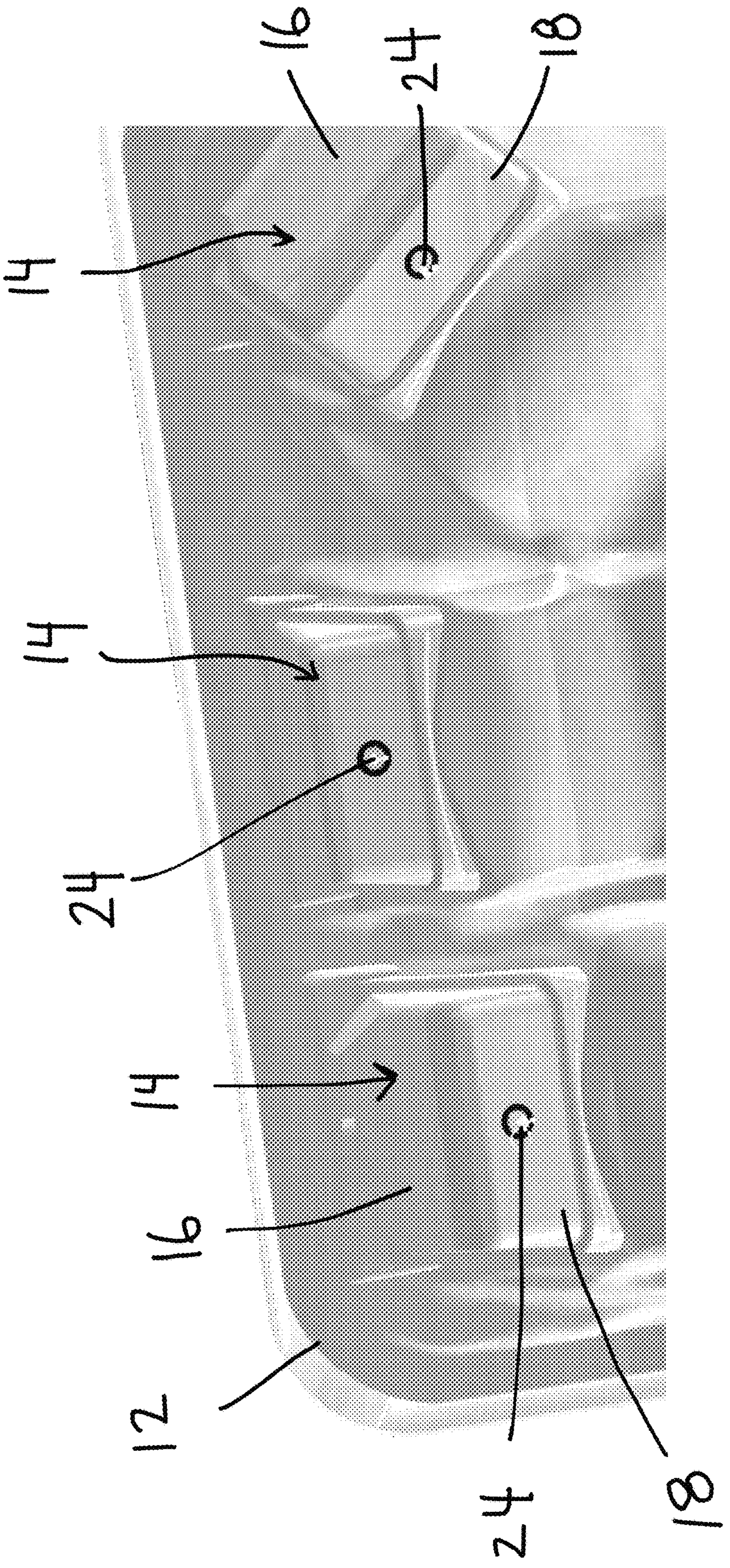
FIG. 5 is another enlarged, perspective view of a portion of a spa, showing the location of drain ports.

FIGS. 3-5 illustrate the shell 12 with the seat inserts 20 removed. As shown therein, each depression or cavity 14 that receives a seat inserts has a drain 24 (also referred to as suction fitting 24) associated therewith. In an embodiment, the drains 24 are located in the floor 18 of the depressions. In other embodiments, the drains are located in the rear wall 16 thereof. It is further contemplated that each depression 14 may have a plurality of drains (e.g., drains in both the rear wall 16 and floor 18). In an embodiment, the drain(s) may be located in one or more of a rear wall, bottom wall and/or side wall of the depression 14). In an embodiment, the drains 24 are covered by the seat inserts 20 when the seat inserts 20 are in the installed position, so they are not visible from the interior of the spa. For example, three drains 24 are not visible in FIG. 2 because they are obstructed by the installed seat inserts 20.

Figure 6:
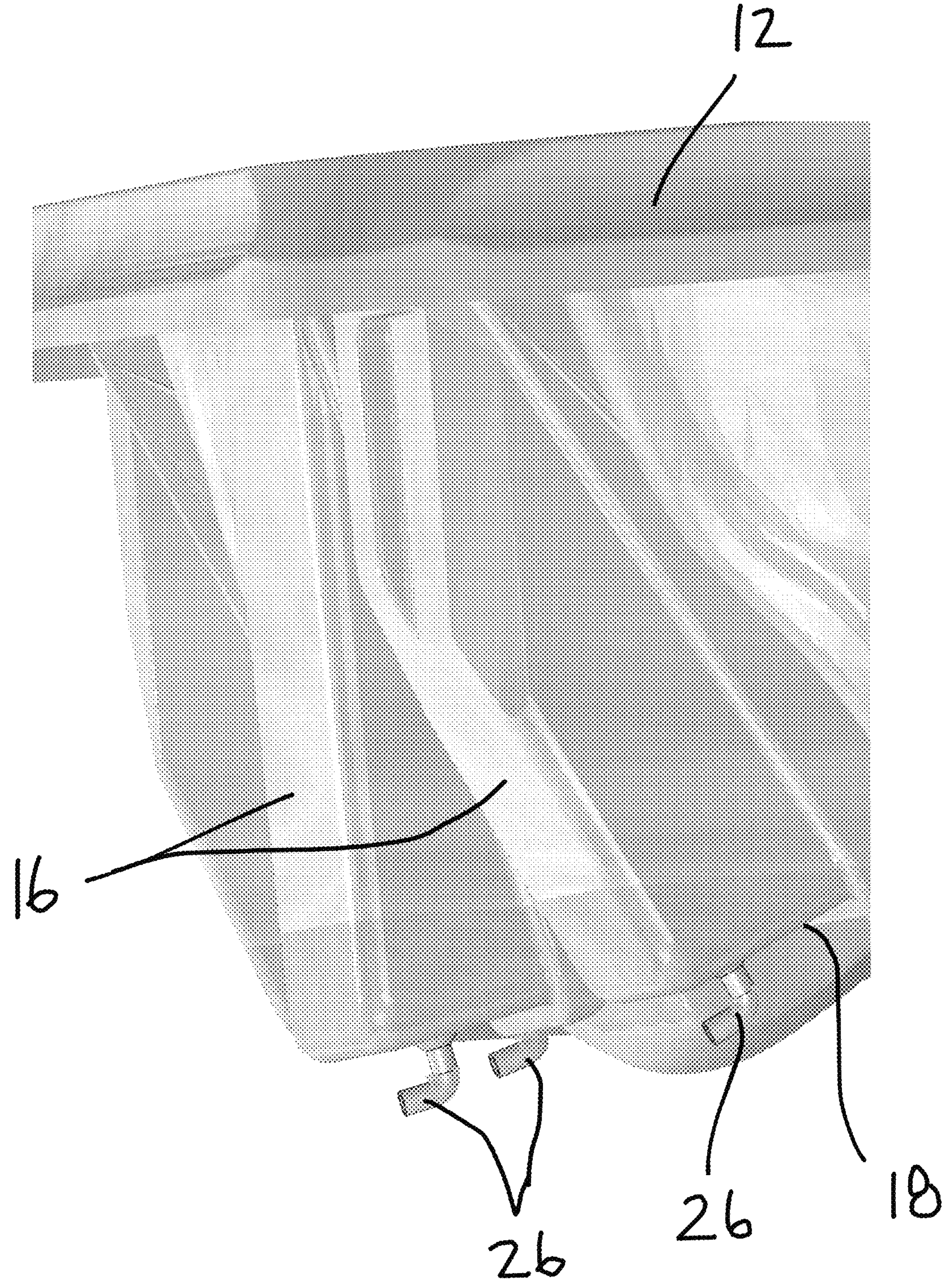
FIG. 6 is another enlarged, perspective view of a portion of a spa, showing the location of drain ports on an underside of the shell.
Figure 7:
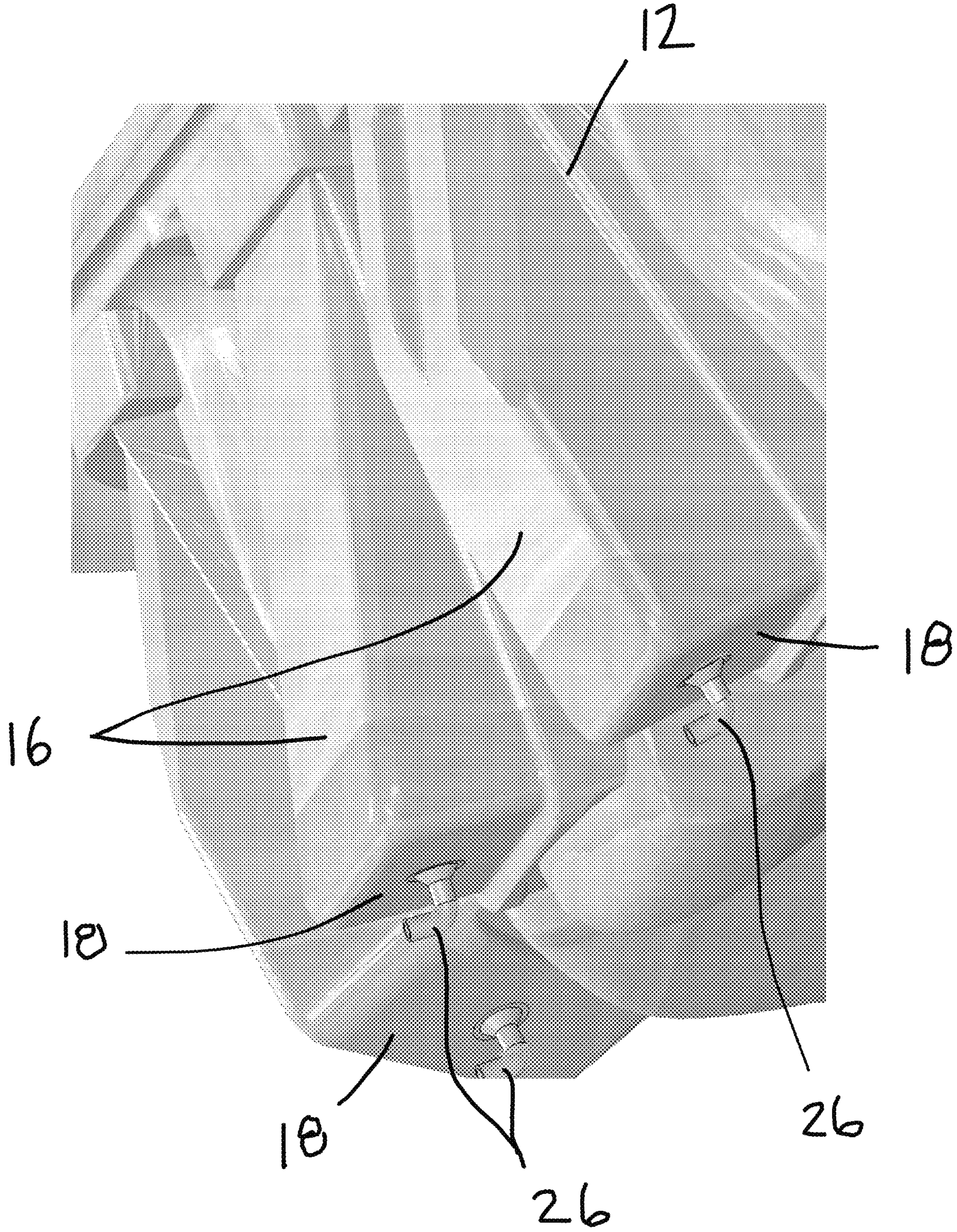
FIG. 7 is another enlarged, perspective view of a portion of a spa, showing the location of drain ports on an underside of the shell.

As shown in FIGS. 6 and 7, the drains 24 extend through the spa shell 12 and include tubing barbs or plumbing connectors 26 that extend from the rear/underside of the shell 12. In an embodiment the barbs 26 are configured for connection to ¾" tubing, although other tubing sizes and connection means known in the art may also be employed.

Figure 8:
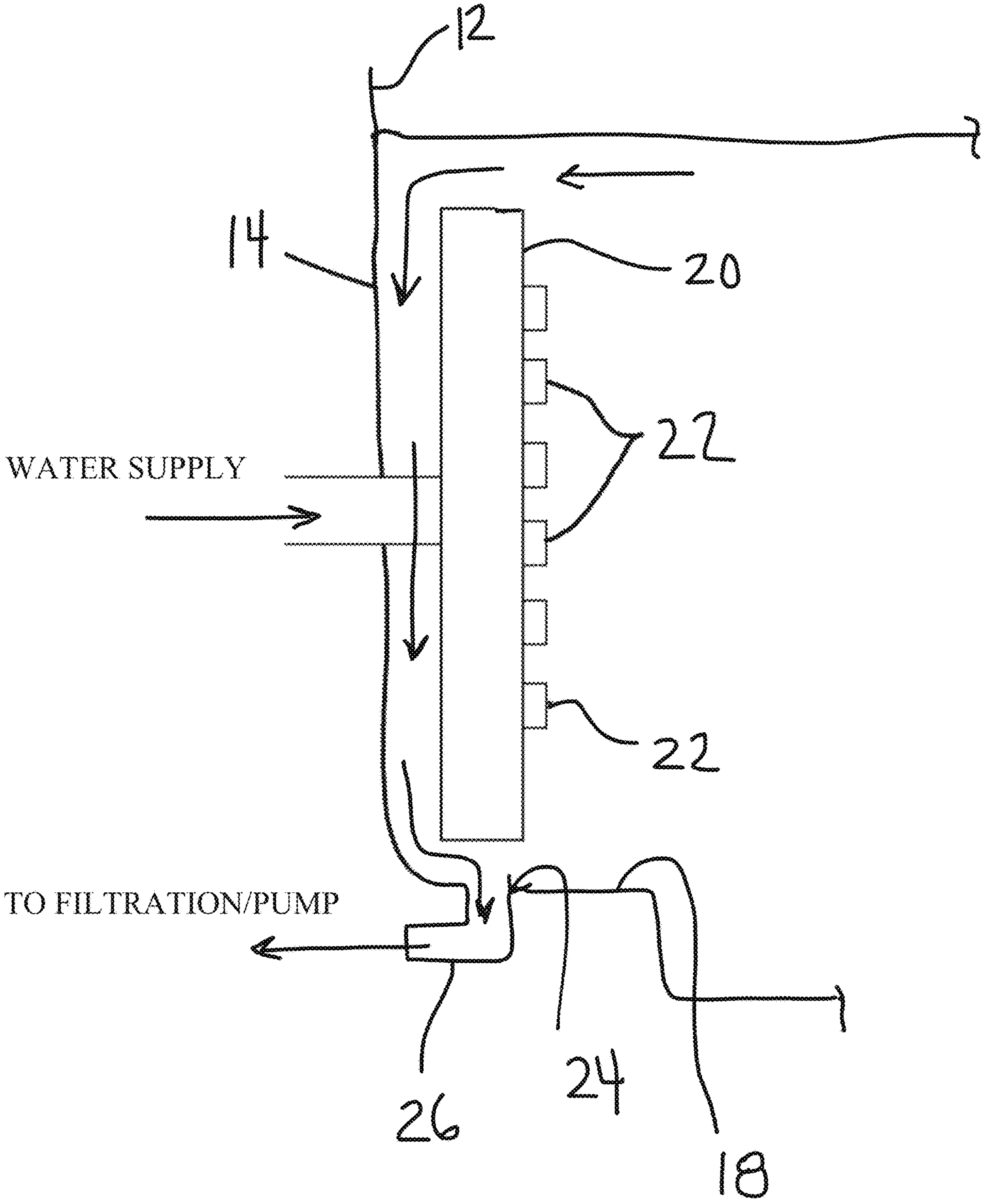
FIG. 8 is a schematic illustration shown water flow within the spa of FIG. 1.

In an embodiment, the drains 24 are each fluidly connected to the water filtration system of the spa such as, for example, fluidly connected via tubing to the suction side of the pump (not shown). In operation, fresh filtered and chemically treated water (treated with, e.g., chlorine, bromine, enzymes, H2O2, etc.) is input into the spa water volume by means known in the art. In an embodiment the fresh water is input via the nozzle arrays or jet assemblies on the seat inserts 20. With reference to FIG. 8, suction from the pump and draining under the force of gravity pulls water from the spa volume into the space behind the seat inserts 20, where it exists through the drains 24 at each depression/recess 14. That is, the removal of the water from the depressions 14 via the drains 24 causes fresh, chemically treated water to flow/be pulled into the normally stagnant water area intermediate the seat inserts 20 and depressions 14. The flow of fresh, chemically treated water within this space provides an excellent source of disinfectant for the water within this space, which is effective to inhibit and/or prevent the buildup of biofilm and the growth of algae, bacteria and the like. As further illustrated in FIG. 8, the water that is removed from the spa 10 via the drains 24 is circulated through the typical plumbing filtration system where it is cleaned, disinfected or otherwise treated (heated or cooled), and recirculated to the spa volume.

Through testing, it has been discovered that the use of drains in each depression/seating position 14 has been effective at preventing and/or removing the buildup of biofilm and the growth of algae, bacteria and the like. In particular, in multiple tests, seat inserts were installed into the cavities 14 as shown. Spas of two different designs and different sizes (one 91×91" single lounger and one 85×85" non-lounger) were allowed to be fouled get filthy with algae three times, and once with a bad case of biofilm. All four times, the inspection of the seat back plumbing showed scum on the hoses. The water chemistry was then adjusted to kill the algae and the biofilm and, and the filtration and circulation system was run for a period of time. In all four cases, upon inspection of the hoses behind the seat inserts, the hoses were clean and free of scum and debris.

The drain system of the present invention, and the specific location of the drains 24 within the cavities 14, is effective at drawing fresh water from the spa volume into the area behind the seat inserts 20, proving a level of spa cleanliness heretofore not seen in the art. In an embodiment, in addition to the drains 24, the spa may also have one or more primary drains, e.g., in the very bottom of the shell 12 and/or on the vertical surfaces of the spa foot well.

While the above description provides examples of the embodiments, it will be appreciated that some features and/or functions of the described embodiments are susceptible to modification without departing from the spirit and principles of operation of the described embodiments.

Accordingly, what has been described above has been intended to be illustrative of the invention and non-limiting and it will be understood by persons skilled in the art that other variants and modifications may be made without departing from the scope of the invention as defined in the claims appended hereto. The scope of the claims should not be limited by the preferred embodiments and examples, but should be given the broadest interpretation consistent with the description as a whole.

What is claimed is:

1. A spa, comprising:
a shell having at least one cavity, the shell being configured to hold a volume of water;
a seat insert having a plurality of hydrotherapy jets, the seat insert being received in the at least one cavity and defining a space between the seat insert and the shell; and
at least one drain associated with the at least one cavity providing for egress of water from the space between the seat insert and the shell;
wherein a size of the at least one cavity corresponds to a size of the seat insert so as to receive the seat insert therein.

2. The spa of claim 1, wherein:
the seat insert is removably received in the at least one cavity.

3. The spa of claim 1, wherein:
the at least one drain is fluidly connected to a circulation system of the spa.

4. The spa of claim 1, wherein:
the at least one drain is fluidly connected to a suction side of a circulation pump of the spa.

5. The spa of claim 1, wherein:
the at least one drain is located in a floor of the at least one cavity.

6. The spa of claim 1, wherein:
the at least one drain is located in a rear wall of the at least one cavity.

7. The spa of claim 1, wherein:
the at least one drain includes a first drain located in a rear wall of the at least one cavity and a second drain located in a floor of the at least one cavity.

8. The spa of claim 1, wherein:
the at least one drain is positioned behind the seat insert.

9. The spa of claim 1, wherein:
the at least one cavity includes a plurality of cavities, each of the cavities having an associated seat insert; and
wherein each cavities of the plurality of cavities includes a drain located behind the associated seat insert.

10. The spa of claim 1, further comprising:
an additional drain located in a foot well of the shell.

11. A method for hydrotherapy, comprising the steps of:
providing a spa having a shell having a recess, and a seat insert arranged within the recess;
circulating water into the spa via at least one hydrotherapy jet on the seat insert; and
circulating water behind the seat insert within the recess by drawing water out of the shell through a suction fitting located within the recess.

12. The method according to claim 11, wherein:
circulating water behind the seat insert includes moving water in a downwards direction behind the seat insert.

13. The method according to claim 11, wherein:
the suction fitting is located in a rear wall of the recess.

14. The method according to claim 11, wherein:
the suction fitting is located in a bottom wall of the recess.

15. The method according to claim 11, wherein:
the suction fitting is a plurality of suction fittings, including a first suction fitting located in a rear wall of the recess, and a second suction fitting located in a bottom wall of the recess.

16. The method according to claim 11, wherein:
the seat insert is removable connected to the shell.

17. A spa, comprising:
a shell having a plurality of recesses formed therein;
a plurality of seat inserts corresponding to the plurality of recesses, the plurality of seat inserts being removably connected to the shell such that each recess and an associated seat insert defines a space therebetween, each seat insert including a plurality of hydrotherapy jets for directing pressurized water into the spa; and
a suction fitting associated with each recess for effecting a flow of water through the space and out of the shell through the suction fitting.

18. The spa of claim 17, wherein:
the suction fitting of each recess is positioned in a floor of each recess.

19. The spa of claim 17, wherein:
the suction fitting of each recess is positioned in a rear wall of each recess.

20. The spa of claim 17, wherein:
each suction fitting is located within the recess behind the associated seat insert such that each suction fitting is not visible from an interior of the shell when the plurality of seat inserts are positioned with the plurality of recesses.

* * * * *